United States Patent [19]

Dhein et al.

[11] 4,031,052

[45] June 21, 1977

[54] AQUEOUS STOVING LACQUER CONTAINING ε-CAPROLACTAM AS A REACTIVE DILUENT

[75] Inventors: Rolf Dhein; Jochen Schoeps; Rolf Kuchenmeister, all of Krefeld, Germany

[73] Assignee: Bayer Aktiengesellschaft, Germany

[22] Filed: Aug. 12, 1975

[21] Appl. No.: 604,012

[30] Foreign Application Priority Data

Aug. 17, 1974 Germany .......................... 2439548

[52] U.S. Cl. ............................ 260/29.4 R; 260/21; 260/22 T; 260/29.4 UA; 428/458

[51] Int. Cl.² .................... C08G 51/24; C09D 3/52

[58] Field of Search ................. 260/29.4 R, 29.2 E, 260/21, 22 R, 22 T

[56] References Cited

UNITED STATES PATENTS

| 3,434,987 | 3/1969 | Dhein et al. | 260/21 |
| 3,474,060 | 10/1969 | Dhein et al. | 260/21 |

*Primary Examiner*—Theodore E. Pertilla
*Attorney, Agent, or Firm*—Connolly and Hutz

[57] ABSTRACT

Aqueous polyester and alkyd resin stoving lacquers containing ε-caprolactam as a so-called reactive diluent and small quantities of volatile organic solvents yield excellently hard coatings which are not brittle.

3 Claims, No Drawings

AQUEOUS STOVING LACQUER CONTAINING ε-CAPROLACTAM AS A REACTIVE DILUENT

Binders which can be diluted with water are becoming increasingly important as a basis for aqueous stoving lacquer systems. To distinguish these binders from dispersion binders, they are frequently referred to as "water-soluble binders".

In order to render raw materials for lacquers (such as alkyd resins, for example) water-soluble without the use of auxiliary agents, purely by neutralisation of free carboxyl groups in end positions or side chains, it is necessary to prepare polymers having very high acid numbers (British Patent Specification No. 356,738). The disadvantage of this is that carboxyl groups are still present in the hardened coatings and they are liable to reduce the resistance of the coating to weathering and corrosion.

There has been no lack of attempts to obtain weather resistant and corrosion resistant coatings also from aqueous systems. It has already been attempted, for example, to add glycerol to aqueous alkyd resin solutions and then employ sufficiently high stoving temperatures so that the glycerol would bring about a cross-linking reaction with the carboxyl groups of the alkyd resin by esterification (British Patent Specification No. 422,130).

The effect that caprolactam has of reducing the viscosity when used as a reactive diluent in the chemistry of isocyanates is already known (K. Wagner, Angewandte Makromolekulare Chemie 37 (1974) No. 538, pages 59 et seq). Diisocyanate polyaddition products of this kind are used as foam and coating compounds but in the field of lacquers they are only used as two-component lacquers on account of their high reactivity. In many cases where numerous colour shades are kept in stock and stored over a long period, the use of two-component lacquers is a disadvantage. It was therefore desired that single component stoving lacquers, for example, those widely used in the motor car industry which contain aminoplast resins as a cross-linking component, should also be obtainable in a form which was poor on volatile organic solvents.

The now commonly used stoving lacquers which can be diluted with water differ from these systems by the fact that they have very low acid numbers, say around 50, and high hydroxyl numbers and can be hardened by cross-linking reaction with aminoplast resins. This cross-linking reaction with aminoplast resins begins at temperatures of around 100° C (Austrian Patent Specification No. 180,407).

In order to increase the solubility of the aqueous laquer solutions, to reduce their viscosity, and to improve the stability of the aqueous solutions, it has been found advisable to add water-miscible alcohols, esters and ketones as auxiliary solvents. An auxiliary solvent often used is ethylene glycol monobutylether (French Patent Specification No. 1,369,013). Under the hardening conditions described above, these organic solvents are completely or almost completely expelled from the films and so these aqueous lacquer systems can only be hardened with a loss of organic solvents, depending on the amount of such organic solvents contained in them.

It has also been attempted to add non-volatile, water-soluble polyhydric alcohols to aqueous lacquer solutions. These polyhydric alcohols reduce the sensitivity of the solutions to oxygen and are so non-volatile in the stoving process that they remain in the coating. Solvent substitutes of this kind may therefore be regarded as reactive diluents. These systems require hardening temperatures which are not very desirable, that is to say 140° to 180° C (German Offenlegungsschrift No. 1,929,593, see examples).

It has now surprisingly been found that highly reactive aqueous lacquer systems which have exceptionally advantageous properties for the purposes of lacquer technology and which do not contain large amounts of volatile organic solvents which cannot be incorporated into the coating, can be obtained by adding ε-caprolactam to the binders.

This invention therefore relates to aqueous stoving lacquers with a reactive diluent containing ε-caprolactam. More particularly, the invention relates to aqueous stoving lacquers based on a mixture of A. polymers which contain carboxyl groups or salts thereof and hydroxyl groups, preferably polyesters,
B. aminoplast resins, and
C. a reactive diluent which is miscible with water, characterised in that the reactive diluent used contains ε-caprolactam.

More particularly, the invention relates to aqueous stoving lacquers based on a mixture of A. 20 to 80, preferably 30 to 80, % by weight, based on the sum of components A to D of carboxyl resp. carboxylate and hydroxyl groups containing polymers, preferably polyesters, respectively alkyd resins,
B. 5 to 40, preferably 10 to 35, % by weight, based on the sum of components A to D, of water-dilutable cross-linkable aminoplast resins,
C. 1 to 60, preferably 5 to 20% by weight, based on the sum of components A to D, of a water-miscible reactive diluent,
D. 0 to 20% by weight, based on the sum of components A to D, of water-dilutable organic solvents and optionally
E. pigments and/or further auxiliary agents, characterised in that the reactive diluent contains ε-caprolactam. The aqueous stoving lacquers usually contain 10 to 95% by weight, based on the aqueous stoving lacquers, of water, 90 to 5% by weight, based on the aqueous stoving lacquers, of the mixture of components A to D and optionally additionally pigments and/or further auxiliary agents in effective amounts.

It was surprising and not foreseeable that ε-caprolactam, which is so readily water-soluble and can be cross-linked by way of an NH function, can in contrast to other auxiliary solvents be fixed in the coating under stoving conditions.

In addition, it was particularly surprising that coatings according to the invention also have surprisingly high resistance to weathering and corrosion. This was all the more surprising in view of the fact that ε-caprolactam is highly soluble in water and polyamides prepared from ε-caprolactam have a high water absorption capacity and are known to be sensitive to corrosion.

In addition it would be expected that a monofunctional reactive diluent would cause a deterioration in the technical properties of the lacquer during the cross-linking reaction with aminoplast resins compared with the affects of polyfunctional polyhydric alcohols because monofunctional reactants reduce the density of cross-linking and would therefore be expected to result in reduced hardness, elasticity and stability.

In practice, however, it is found that the coats obtained from the lacquer systems according to the invention are very hard without becoming brittle. In addition, they show surprisingly little tendency to become yellow.

Highly pigmented stoving lacquers, for which the systems according to the invention are particularly suitable, are also distinguished by their exceptionally smooth, level surfaces.

Water-dilutable alkyd resins or oil-free polyesters which can be diluted with water are particularly suitable for the production of the stoving lacquers according to the invention. $\epsilon$-Caprolactam is also found to be a suitable reactive diluent in other lacquer systems which can be diluted with water so long as the components which undergo cross-linking are aminoplast resins such as melamine resins or urea resins.

By "polyesters" there are to be understood in the following polyesters free of fatty acids and oils and by "alkyd resins" there are to be understood fatty acid-modified or oil-modified polyesters.

By alkyd resins and polyesters there are to be understood polycondensates produced by polycondensation of alcohols and carboxylic acids according to known methods of the kind defined in Römpp's Chemielexikon, Vol. 1, page 202, Franckh'sche Verlagsbuchhandlung Stuttgart, 1966 or described, for example, by D. H. Solomon, The Chemistry of Organic Film Formers, pages 75–101, J. Wiley & Sons Inc., New York 1967.

Alcohols suitable for the preparation of the alkyd resins, respectively polyesters are aliphatic, cycloaliphatic and/or aromatic alcohols containing 1 to 6, preferably 1 to 4, hydroxyl groups attached to non-aromatic carbon atoms, glycols such as ethylene glycol, propylene glycol, butane diols; ether alcohols such as diethylene and triethylene glycols; oxethylated bisphenols, perhydrogenated bisphenols; trimethylolethane, trimethylolpropane, glycerol, pentaerythritol, dipentaerythritol, mannitol and sorbitol; monohydric alcohols which have a chain terminating action such as propanol, butanol, cyclohexanol and benzyl alcohol.

Acid components suitable for the preparation of the alkyd resins, respectively polyesters are aliphatic, cycloaliphatic saturated, or unsaturated and/or aromatic polybasic carboxylic acids, preferably di-, tri- and tetrabasic carboxylic acids containing 4 to 12 carbon atoms per molecule and the esterificable derivatives thereof (e.g. anhydrides or esters) e.g. phthalic acid anhydride, isophthalic acid, terephthalic acid, tetrahydro- and hexahydrophthalic acid anhydride, trimellitic acid anhydride, pyromellitic acid anhydride, maleic acid anhydride, adipic acid and succinic acid anhydride as well as halogenated acids such as chlorophthalic acid and Het acid.

Monocarboxylic acids suitable for the preparation of the alkyd resins, respectively polyesters, are aliphatic, cycloaliphatic saturated and unsaturated and/or aromatic monocarboxylic acids containing 6 to 24 carbon atoms per molecule such as benzoic acid, butylbenzoic acid, tolyl acid, hexahydrobenzoic acid, abietic acid, lactic acid as well as fatty acids and esters thereof such as linseed oil, soya bean oil, wood oil, safflower oil, dehydrated castor oil and castor oil, cotton seed oil, ground nut oil, tall oil fatty acids, linseed oil fatty acid, the fatty acids of soya bean oil, of wood oil, of safflower oil and of castor oil and dehydrated castor oil and products obtained from natural unsaturated oils or fatty acids by conjugation or isomerisation. Suitable saturated fatty acids are, for example, coconut oil and $\alpha$-ethylhexanoic acid.

The molecular weight destined as number average of the polyesters and alkyd resins is 2,000 to 10,000 (molecular weights below 5,000 destined by vapour pressure osmosis in dioxane and acetone; if both values differ from each other the lower value is considered to be the more accurate one; molecular weights above 5,000 destined by membrane osmosis in acetone).

The polyesters and alkyd resins are prepared, according to known methods by condensation. The starting materials are usually reacted at temperatures of 140° to 250° C in an inert gas atmosphere, e.g. nitrogen, with the splitting-off of water until the desired acid number has been reacted.

Particularly suitable polyesters and alkyd resins are, for example, the polyester polysemiesters which can be obtained by a two-stage reaction from hydroxyl group-containing polyesters, respectively alkyd resins and acid anhydrides (German Auslegeschrift No. 1,519,146), the tetrahydrophthalic acid polysemiesters being particularly preferred.

$\alpha$-Caprolactam reactive diluents are also suitable for air-drying binder systems which are suitable for a reaction with aminoplast resins or for coil coating raw materials (German Offenlegungsschrift No. 1,917,162).

The polyesters can be replaced partly or completely by water-dilutable acryl resin, epoxide resins, polyurethanes and/or polyethers.

Suitable aminoplast resins are, for example, melamine-formaldehyde or urea-formaldehyde condensation products. Melamine resins are the melamine methylol compounds partly or completely etherified with $C_1$–$C_4$ monohydric alcohols described in, for example, French Patent Specification No. 943,411 or by D. H. Solomon, The Chemistry of Organic Film Formers, pages 235–240, J. Wiley & Sons Inc., New York 1967. The melamine resins can partly or completely be replaced by other cross-linkable aminoplasts as described for example, in "Methoden der Organischen Chemie" (Methods of Organic Chemistry) (Houben-Weyl), Vol. 14/2, part 2, 4th edition, Georg-Thieme Verlag, Stuttgart 1963, pages 319 et seq.

In addition to the reactive diluents according to the invention, other water-miscible polyhydric alcohols which can be incorporated by condensation may also be used in minor quantities of between 0 and 10% by weight, based on the lacquer. Polyhydric alcohols of this kind include e.g. glycols, ether glycols and glycerol.

The free acid groups of the polyesters resp. alkyd resins are usually completely neutralized by inorganic or organic bases. In many cases, however, the polyesters resp.alkyd resins are sufficiently water-soluble if neutralized in an amount of 70 to 80%. Suitable bases are, for example, ammonia, primary secondary and tertiary amines such as ethylamine, diethylamine, triethylamine, dimethylethanolamine, mono-, di- and triethanolamine, dimethylaminopropanol, and optionally alkali hydroxides.

If the stoving lacquer systems according to the invention are used in the particularly preferred field of highly pigmented stoving lacquers of the kind which are used as intermediate coats in the motor car industry, however, it is advisable to use as reactive diluent only the $\epsilon$-caprolactam in combination with the polyester polysemiesters as binders, because these sysems have less tendency to run on vertical surfaces and a thick lacquer coat can be obtained from them.

In many cases it is advisable to add small quantities of auxiliary solvents to regulate the viscosity, for example monohydric alcohols such as ethanol, isopropanol, butanols or glycol monoalkylethers. Exceptionally good flow properties are obtained with isopropanol in combination with ε-caprolactam.

In addition to the above mentioned additives, the stoving lacquers according to the invention may contain the usual additives, pigments and auxiliary agents for lacquers. The pigments may include those commonly used in the lacquer industry such as titanium dioxide, iron oxide, chromium oxide, zinc sulphide, carbon black or aluminium bronze. Fillers such as silicates or sulphates may also be used.

The lacquers are applied to the surfaces of the supports by the usual methods such as spraying, dipping, casting, spread coating or coil coating and are stoved at temperatures of about 80° to about 260° C.

The parts indicated in the following Examples are parts by weight, the percentages are percentages by weight.

PREPARATION OF A POLYESTER A WHICH CAN BE DILUTED WITH WATER

A ricinic alkyd resin having a ricinic oil content of 34% is prepared from 663 parts of trimethylolpropane, 553 parts of pentaerythritol, 537 parts of benzoic acid, 1301 parts of phthalic acid anhydride and 1847 parts of castor oil in a nitrogen atmosphere at 260° C with simultaneous ester interchange, esterification and dehydration of the castor oil. The ricinic alkyd resin obtained is then reacted with tetrahydrophthalic acid anhydride at 150° C to produce a polysemiester having an acid number of 48, a viscosity according to a time of outflow of 105 seconds (DIN 53 211, 50% in xylene) and a calculated hydroxyl number of 62.

As melamine resin B which can be diluted with water a methylated methylol melamine resin (Resimene 730, Monsanto) is used.

EXAMPLE 1

2520 Parts of polyester A are dissolved in 1080 parts of ε-caprolactam and 400 parts of isopropanol.

A water diluted lacquer of the following composition is prepared from 33.3 parts of this solution which has a polyester content of 63% and contains 90% of film forming substance (including the reactive diluent ε-caprolactam):

33.30 parts of binder solution
1.39 parts of dimethylethanolamine
2.59 parts of melamine resin B, as a 90% solution in isopropanol,
12.65 parts of titanium dioxide rutile
1.43 parts of iron black,
1.50 parts of strontium chromate,
0.30 parts of highly disperse silicon dioxide (Aerosil)
12.92 parts of natural heavy spar,
33.92 parts of water.

This lacquer is adjusted to an operating viscosity according to a time of outflow of 53 seconds (DIN 53 211) with 19.16 parts of water.

Its theoretical solid content is 56.3%. When a 60 g sample of lacquer applied to a metal sheet 21 cm in diameter is heated to 120° C for 1 hour and the residue from the stoving process is tested, the true solid content is found to be 56.3%.

In addition to testing the stoving residue, the loss by stoving was examined by gas chromatographic analysis by heating a sample of lacquer in a closed system and collecting the volatile components in water. Examination of the solution showed a caprolactam loss of about 1%.

When the lacquer was applied to metal by means of spray guns, perfect lacquer coats which had no tendency to run were obtained even on vertical surfaces. These coats still had thicknesses of 50 to 60 μ when hardened (30 minutes at 120° C). The lacquer has an exceptionally smooth surface, form adherence to the metal and elasticity.

EXAMPLE 2

A top coat lacquer was prepared from polyester A and melamine resin B with the reactive diluent ε-caprolactam and in comparison experiment D ε-caprolactam was replaced by another diluent and in comparison experiment C it was replaced by an additive which acts only as solvent. In other respects, the lacquer had the same composition in each case and in addition to melamine resin B it contained titanium dioxide pigment (rutile) in quantities of 60%, based on the quantity of binder and reactive diluent. Lacquer coats stoved at 120° C for 30 minutes had the following properties:

|  | Comparison Experiment C | Parts | Comparison Experiment D | Parts | Example according to the invention | Parts |
|---|---|---|---|---|---|---|
| Binder | Polyester A | 21 | Polyester A | 21 | Polyester A | 21 |
| Cross-linking agent | Melamine resin B | 20% of A | Melamine resin B | 20% of A | Melamine resin B | 20% of A |
| Reactive diluent | — |  | Glycerol | 9 | Caprolactam | 9 |
| Volatile solvents | Ethylene glycol monobutylether | 9 | — |  | — |  |
|  | Isopropanol | 3.3 | Isopropanol | 3.3 | Isopropanol | 3.3 |
| Degree of gloss of the coatings (Gardner 20°) | 89 |  | 4 |  | 80 |  |
| Yellowing (Elrepho) | 74 |  | 83 |  | 86 |  |
| Pendulum hardness | 108 seconds |  | 51 seconds |  | 85 seconds |  |
| Yellowing under stoving conditions of 30 minutes/150° C | 47 |  | 70 |  | 76 |  |
| Pendulum hardness under stoving conditions of 30 minutes/150° C | 130 seconds |  | 102 seconds |  | 130 seconds |  |

We claim:
1. Aqueous stoving lacquers based on a mixture of
   A. polymers which contain carboxyl groups or salts thereof and hydroxyl groups,
   B. aminoplast resins, and

C. a reactive diluent which is miscible with water, characterised in that the reactive diluent used contains ε-caprolactam.

2. Aqueous stoving lacquers according to claim 1 based on a mixture of
   A. 20 to 80% by weight, based on the sum of components A to D, of polymers containing carboxyl or carboxylate groups and hydroxyl groups,
   B. 5 to 40% by weight, based on the sum of components A to D, of water-dilutable cross-linkable aminoplast resins,
   C. 1 to 60% by weight, based on the sum of components A to D, of a water-miscible reactive diluent,
   D. 0 to 20% by weight, based on the sum of components A to D, of water-dilutable organic solvents and optionally
   E. pigments or further auxiliary agents, characterised in that the reactive diluent contains ε-caprolactam.

3. Aqueous stoving lacquers according to claim 1 wherein (A) is a polyester of an alcohol and a carboxylic acid.

* * * * *